United States Patent [19]
Smith, Jr.

[11] 3,931,868
[45] Jan. 13, 1976

[54] EMERGENCY RESCUE DEVICE

[76] Inventor: Charles P. Smith, Jr., 336 N. Palm Drive, Beverly Hills, Calif. 90210

[22] Filed: Aug. 12, 1974

[21] Appl. No.: 496,335

[52] U.S. Cl. .................. 182/63; 182/129; 182/82; 182/145; 244/137
[51] Int. Cl.² .......................................... A62B 1/02
[58] Field of Search ............. 182/142, 82, 230, 129, 182/12, 13, 16, 63; 244/137; 212/71

[56] References Cited
UNITED STATES PATENTS

| 794,712 | 7/1905 | Hill | 182/142 |
|---|---|---|---|
| 3,176,795 | 4/1965 | Taylor | 182/82 |
| 3,393,769 | 7/1968 | Springer | 182/82 |
| 3,464,520 | 9/1969 | Anderson | 182/142 |

FOREIGN PATENTS OR APPLICATIONS

| 1,812,118 | 8/1970 | Germany | 244/137 |
|---|---|---|---|
| 751,766 | 1/1967 | Canada | 212/71 |

Primary Examiner—Reinaldo P. Machado
Attorney, Agent, or Firm—Fulwider Patton Rieber Lee & Utecht

[57] ABSTRACT

A helicopter supported gondola is provided with means for stabilizing the position of the gondola with respect to the exterior wall of a building so that people trapped within the building may be removed from it and safely lowered to the ground. Means are provided for stabilizing the gondola so that the downdraft from the helicopter can be used to control the position of the gondola, and other means are provided to hold the gondola firmly to the side of the building so that people may move from the building to the gondola.

8 Claims, 8 Drawing Figures

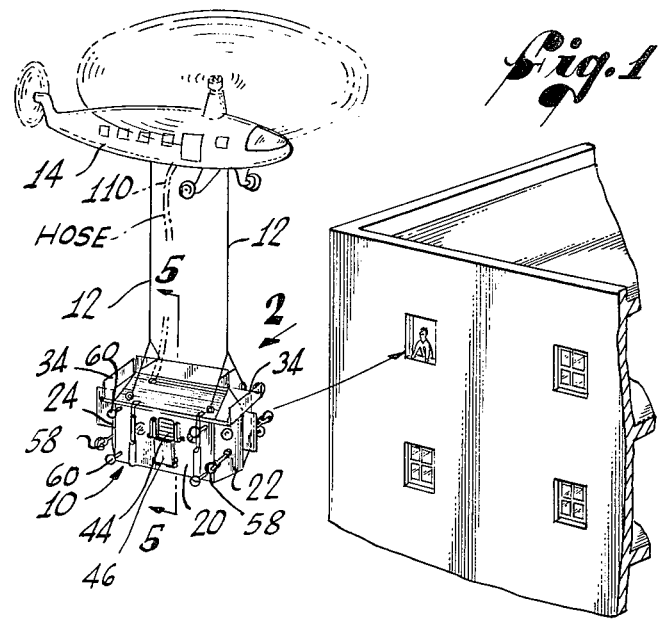
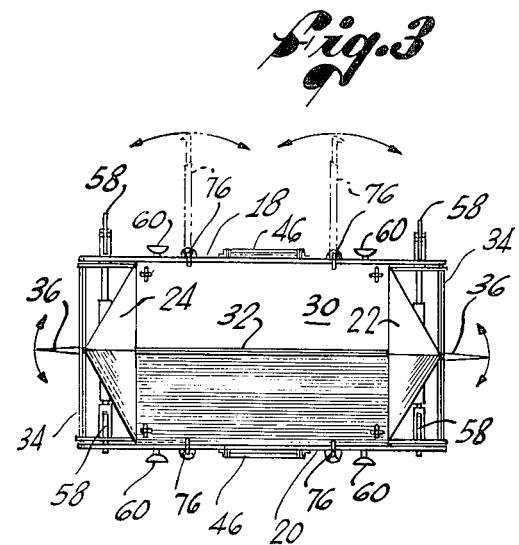
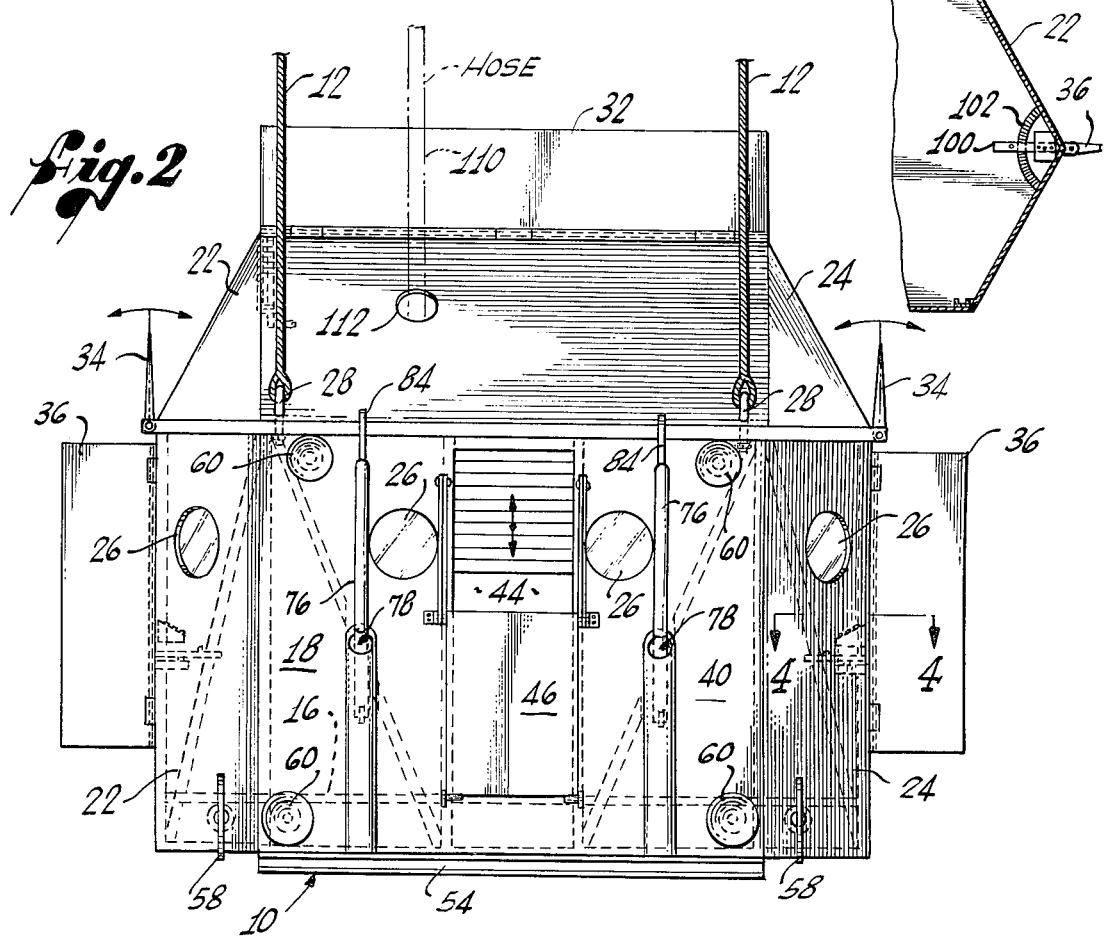

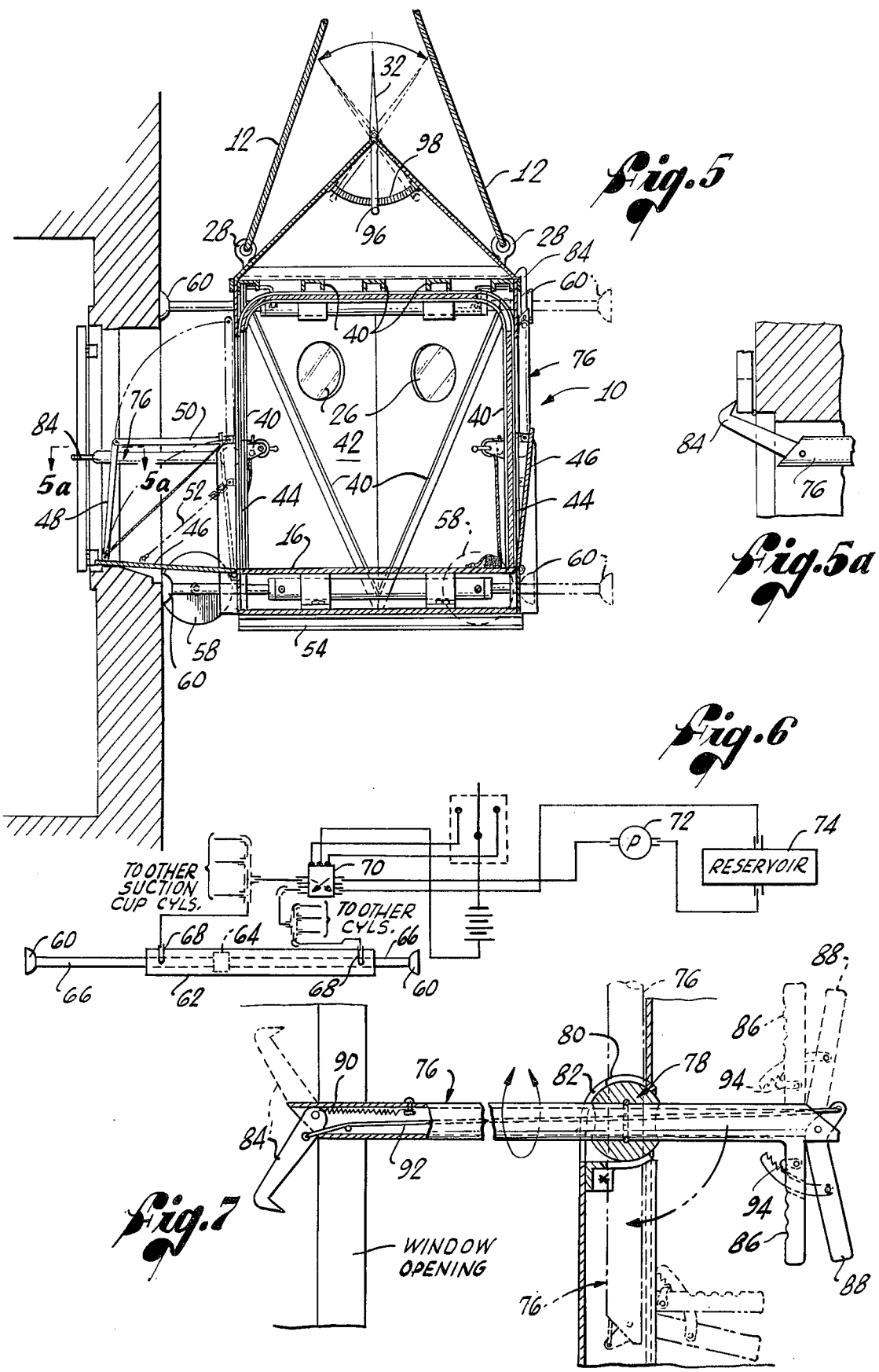

3,931,868

EMERGENCY RESCUE DEVICE

BACKGROUND OF THE INVENTION

The problem of safely removing people from burning or damaged buildings has long been of concern, and the requirement for the provision of fire escapes and many other safety features attests to the continuing need for such rescue devices. However, as the height of the buildings has increased, the difficulty of rescue has increased even faster. While the prevention of fire and its spread is important, and the actual extinction of the fire, once it has started, is also important, the actual physical removal of persons from such a building is probably the most important phase.

Historically, non-flammable fire escapes have been helpful in the removal of people from a burning building, but such fire escapes are of practical use only when the buildings are limited to heights of three or four floors. The problems of trying to evacuate a modern forty-story building, for example, by means of non-flammable fire escapes are monumental.

It has been suggested that cages be provided that can be hoisted to the top of the building from the ground so that people can get to them, and the cages are then let down to the ground so that the people may escape from the building. Such systems either require some form of pulley to be installed at the time the building is built, or the hoisting of a pulley, for example, on the end of a long ladder, so that the operation of a cage or car may be controlled from the ground.

The use of such cages is quite practical within the limits imposed, since it offers a means for quickly removing a large number of people. However, modern construction requires other provisions.

The present invention makes use of a container or gondola that is supported by a large helicopter, and is provided with control means that aid in maintaining the desired position and the stability of the gondola when it is taking on passengers, or when it is being maneuvered or maintained in a predetermined position with respect to the buildings. The stability of the gondola is particularly important when it is recalled that the downdraft from a helicopter can cause extreme turbulence that could move the gondola away from the desired position and into an undesired position. The present invention makes use of the downdraft from the helicopter to provide control of the gondola so that it can be more easily and accurately positioned, and its stability will be increased.

SUMMARY OF THE INVENTION

The present invention relates to a helicopter-supported gondola of the type adapted to remove people trapped in buildings, the gondola having adjustable vanes that engage the downdraft from the helicopter and thus provide a horizontally directed force on the gondola. In addition, the gondola is provided with means to space it from the building while holding it firmly to the building.

BRIEF DESCRIPTION OF THE DRAWINGS

FIG. 1 is a perspective view indicating the general method of operation, with the gondola being shown transported by helicopter toward a building from which a person is to be rescued;

FIG. 2 is a side elevational view, taken in the direction of the arrow 2 in FIG. 1;

FIG. 3 is a top plan view of the gondola to a reduced scale;

FIG. 4 is a fragmented sectional view of one end of the gondola, taken along the line 4—4 of FIG. 2 showing the location of positioning means for the vertically extending vanes;

FIG. 5 is a vertical cross-sectional view taken across the width of the gondola and showing the positioning of the various elements when the gondola is in a condition to receive persons from the building;

FIG. 5a is a fragmentary horizontal view of the end of an engaging means showing the method of engaging the portion of a building surrounding a window;

FIG. 6 is a schematic circuit showing the electrical and hydraulic circuits for controlling the extension of the suction cup devices; and FIG. 7 is a view partially in section showing the construction and mounting of the building engaging means.

DESCRIPTION OF PREFERRED FORM

In the drawings, the numeral 10 indicates generally a gondola supported by cables 12 from a helicopter 14. Preferably, the cables 12 can be let out or retracted from the helicopter so that the distance between the helicopter 14 and the gondola 10 can easily be varied.

As indicated in FIG. 2, the gondola 10 is a generally rectangular housing having a floor 16, opposite sides 18 and 20 and ends 22 and 24. The gondola structure is preferably made of strong, light weight material, such as aluminum alloys, and with stronger sections such as steel, where needed. Windows 26 are provided in the sides and ends to permit the efficient operation of the gondola and to prevent the feeling of claustrophobia.

The cables 12 are connected by eyes 28 to appropriate parts of the framework, and a non-structural fairing 30 of a generally pyramidal shape extends over the top of the gondola 22 and acts to deflect the downdraft from the helicopter 14, so that the downdraft does not increase the apparent weight of the gondola 10. At the top peak of the fairing 30 is a vertically extending, adjustable vane 32, hereinafter described. As indicated, the ends 22 and 24 of the gondola are preferably extended slightly outwardly in the center so that the capacity of the gondola is increased and the gondola has, in fact, a hexagonal shape, as indicated in FIG. 3.

At each of the ends 22 and 24, there is a corresponding additional vane 34 that is rotatable about a horizontal axis and at the outermost edges of the ends are vertically extending vanes 36 rotatable about a vertical axis. All of the vanes are adjustable by an operator within the gondola and are for the purpose of positioning the gondola so that its location and attitude may be adjusted and maintained for the most efficient and safest operation.

As best seen in FIGS. 2 and 5, a gondola 10 includes suitable frame members, indicated generally by the numeral 40, that form the basic shape of the structure, to which light weight sheet material 42 is applied to form the walls of the gondola. The sheet material 42 should be a relatively light weight material, such as an aluminum alloy, and as previously mentioned, windows 26 are formed in it.

For maximum convenience and efficiency, the gondola is preferably constructed so that people may enter the gondola through either side 18 or side 20, and to this end, each of the sides is provided with an entry 44. The entry is centrally located with respect to the sides 18 and 20, and includes a hinged panel 46 that acts as a gangplank, hinged at the floor level, and capable of being swung outwardly and downwardly to form a gangplank or to be moved upwardly to close the lower portion of the entrance 44. A hinged post 48 is located on each side of the panel 46 at the upper or outer end thereof, and a rail 50 is pivotally connected to the upper end of the post 48 and the frame surrounding the opening 44 to form a hand railing for people entering the gondola 10. If desired, a chain or cable 52 may be provided to limit the downward movement of the gangplank 46, as indicatd in FIG. 5. The upper portion of the opening 44 may be closed by sliding panel construction of the general type used in roll doors, etc. The same construction is provided on both sides, and hence, the gondola can be lowered with either side adjacent the building from which people are to be rescued.

At its under surface and spaced from the floor 16, the gondola 10 is provided with skids 54 to stiffen and support the gondola when it rests upon the ground. There is thus a space between the floor 16 and the skids 54 for the installation of mechanical equipment. It is very important that the floor of the gondola be plane, without any obstructions to trip over. It will be appreciated that most persons will enter the gondola under conditions of great stress, sometimes bordering on panic, and there should be no obstructions to cause tripping, slipping and falling. For this reason, the floor level is above the lower-most portion of the gondola 10 so that various operating mechanisms to extend and retract the building-engaging means may be located below the level of the floor. Thus, as seen in FIG. 5, the gondola 10 is provided with at least a pair of wheels 58 on each side of the gondola, so that the gondola may be raised or lowered to align with a building window with a minimum of sliding friction. The wheels 58 are extended or retracted by piston means, hereinafter described, and are movable so that any necessary adjustments may be made, such as might be caused by the particular architecture of the building.

The wheels 58 provide a certain spacing of the gondola 10 from the building, and to hold the gondola 10 to the building, there are provided a plurality of suction cups 60 on each of the sides 18 and 20, the suction cups, like the wheels 58, being extendable and retractable by means of hydraulic cylinders. The function of the suction cups is to engage the face of the building and to create a seal to the building to hold the gondola 10 to the building and prevent undesired sudden movements of the gondola.

An example of means for extending and retracting the suction cups 60 is indicated in FIG. 6. In that drawing, there is shown a double acting hydrulic cylinder 62 having a piston 46 therein, the piston being mounted on a shaft 66 passing through the cylinder and extending beyond each end. The cylinder 62 is provided with fluid couplings 68 at each end and is connected through suitable hydraulic tubing to a valve 70 that distributes the hydraulic fluid from a pump 72 and reservoir 74, as desired by the operator. The valve 70 may be either manually or electrically operated, as illustrated, and is so connected that when a suction cup 60 is to be extended to the left as illustrated in FIG. 6, hydraulic fluid from the pump 72 is directed through the valve 70 to enter the right hand end of the hydraulic piston 62 through fluid coupling 68. This will urge the piston 64 to the left, thereby displacing fluid in the left hand end of the hydraulic cylinder 62, out through the fluid coupling 68 and through the suitable tubing and valve 70 back to the reservoir 74.

It will be appreciated that the operating diagram illustrated in FIG. 6 is exemplary only, and further, that it shows only the control and operating means for a single hydraulic cylinder. The other three hydraulic cylinders for the remaining suction cups are all connected as indicated, and it will be appreciated that similar controls and hydraulic cylinders may be provided for the extension and retraction of the wheels 58.

To anchor the gondola 10 to the guilding, hooks are provided that extend through the window openings and engage the frames or the portions of the building at the side of the window.

This construction is indicated generally in FIG. 7 where a tubular member 76 is rotatably mounted on the side of the gondola adjacent the doorway 44. As seen in that figure, a ball member 78 is attached to the tubular member 76, and the ball is retained in a socket member 80 that has a slot in it, so that the tube may be rotated upwardly to the position indicated in dotted outline for stowage purposes. The outer end of the tube 76 carries a latch member 84 and the inner end of the tube carries handle members 86 and 88 that are used to position the latch 84.

While any suitable latching means may be used, the form shown is very satisfactory. In this form, the latch 84 is pivotally mounted in the end of the tube 76 and a spring 90 urges the latch to a position substantially aligned with the tube. The latch is pivoted against the urging of the spring 90 to the position indicated in solid outline in FIG. 7 by means of a cable 92 anchored to the latch on the side of the pivot opposite the point of attachment of the spring 90. The cable 92 is connected to the handle means 86 and 88 to pull the latch 84 to bear against the side of the window.

The form of handle shown makes use of a fixed handle member 86 and a pivoted handle member 88, to whose inner end the cable 92 is attached. As the handle 88 is pivoted toward the fixed handle 86, the cable 92 is tensioned and pulls the latch 84 toward a position perpendicular to the axis of the tube 76, so that the latch engages the side of the window opening, as shown in FIG. 5a. A suitable detent 94 holds the handle 88 in its desired position.

It will be appreciated that in use, the tube 76 will be removed from its stowed position, indicated in dotted outline in FIG. 7, by grasping the handles 86 and 88 and pulling them upwardly and inwardly, so that the tube 76 is projecting substantially straight outwardly, where it may be extended through a window. The handles 86 and 88 may, of course, be rotated about the axis of the tube 76 to position the latch 84 in the desired direction, whereupon the handles may be squeezed to engage the latch against the wall of the building.

As previously mentioned, the vanes 32, 34 and 36 play an important part in contributing to the efficient operation of the rescue gondola 10. It is well known that the rotor blades of a helicopter create a large downdraft that can cause a variety of unexpected results in the proximity of a building. Thus, the downdraft is affected by the architectural shape of the building, such as set-backs, parapets, etc., and consequently, the vanes must be adjusted for each condition. Ideally, of course, the gondola would hang steady and square with the helicopter without any tendency to shift or turn. However, this ideal condition is seldom encountered, and hence, the vane 32 is provided at the top of the gondola 10 to cause the downdraft to move the gondola laterally from side to side. The position of the vane 32 can be adjusted by the operator within the gondola 10 by shifting a handle 96, shown in FIG. 5. The handle may be retained in its set position by a suitable detent means, such as a toothed rack 98. A similar handle 100 and detent 102 may be provided to adjust each of the vertical end vanes 36. The vertical end vanes 36 are generally used to cause a certain amount of rotation of the gondola 10 about a generally vertical axis.

The end vanes 34, each rotatable about a horizontal axis, are preferably controlled simultaneously by a linkage or chain mechanism extending between the two axes, and may be positioned by manual control means, such as those previously described, or by a motor. The end vanes 34 control and force directed on the gondola 10 tending to move it endwise.

While rescue devices have previously been proposed for use in the exterior of buildings, this requires that certain equipment be placed on the building well in advance of the emergency. Thus, only certain specific buildings could make use of such rescue devices. The present device is transportable to any fire or disaster and can be supported by helicopter, so that no special construction of the building is necessary. Furthermore, the use of the adjustable vanes and the various holding means that position and retain the gondola 10 with respect to the building provide a universally usable rescue system not heretofore available.

It should be realized that while the gondola 10 has been described as being particularly useful for the rescue of people, it can also be used to direct a stream of water onto a fire. Thus, if so desired, a hose 110 may be lowered from the helicopter and passed through a hole 112 in the roof of the gondola 10, so that a fire fighter may roll back the upper portion of the door and direct a stream of water onto the fire.

While a preferred form of the device has been shown that is fully capable of achieving the objects and securing the advantages heretofore set forth, it will be realized that modifications and changes may be made, and consequently, the protection afforded by this patent should not be limited to the particular form or arrangement of parts herein described and shown, except as limited by the claims.

I claim:

1. A rescue gondola of the class described which includes:
    a framework defining a passenger-carrying compartment capable of holding a plurality of people;
    a covering for said framework;
    means connected to said framework for suspending said compartment beneath an aircraft that directs a large flow of air downwardly; and
    movable vanes mounted on said compartment to intercept said downwardly directed flow of air, said vanes being adjustable from inside said compartment to apply a horizontally directed force to said compartment, whereby said compartment may be aligned with an opening in a vertical wall of a building.

2. A rescue gondola as defined in claim 1, having:
    means adapted to engage the surface of a building to retain said compartment in fixed relation thereto.

3. A rescue gondola as defined in claim 1 having:
    wheel means adapted to bear against the surface of a building to permit movement along said surface.

4. A rescue gondola as defined in claim 1 having:
    hook means extendable to project inside a building and engage the inside surface of an outside wall of a building to hold said gondola to the building.

5. A rescue gondola as defined in claim 1 having:
    wheel means adapted to bear against the surface of a building to permit movement along said surface; and
    hook means extendable to project inside a building and engage the inside surface of an outside wall of said building to hold said gondola to said building.

6. A rescue gondola as defined in claim 1, in which said movable vanes include a longitudinally extending vane movable about a horizontal axis and extending generally upward from said axis, a pair of transversely extending vanes movable about horizontal axes and extending generally upward from said axes, and a pair of vanes movable about vertical axes and extending generally outward from each end of said gondola.

7. A rescue gondola as defined in claim 6, having:
    wheel means adapted to bear against the surface of a building to permit movement along said surface; and
    hook means extendable to project inside a building and engage the inside surface of an outside wall of said building to hold said gondola to said building.

8. A rescue gondola as defined in claim 7 having:
    control means operable to move said vanes about their respective axes; and
    means acting to retain said control means in their adjusted positions.

* * * * *

UNITED STATES PATENT AND TRADEMARK OFFICE
CERTIFICATE OF CORRECTION

PATENT NO. : 3,931,868
DATED : January 13, 1976
INVENTOR(S) : CHARLES P. SMITH, JR.

It is certified that error appears in the above-identified patent and that said Letters Patent are hereby corrected as shown below:

Column 4, line 20, after "slot" insert -- 82 --

Signed and Sealed this eighteenth Day of May 1976

[SEAL]

Attest:

RUTH C. MASON
*Attesting Officer*

C. MARSHALL DANN
*Commissioner of Patents and Trademarks*